March 24, 1942.  I. J. NOVAK  2,277,602
METHOD OF MAKING AN ENDLESS WOUND CLUTCH FACING
Filed July 24, 1939  2 Sheets-Sheet 1
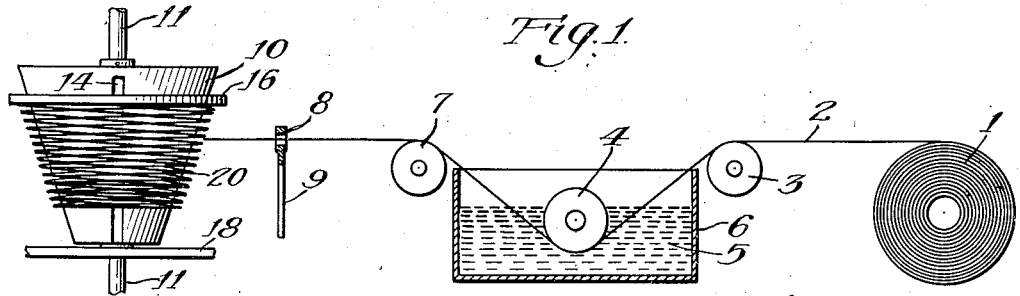
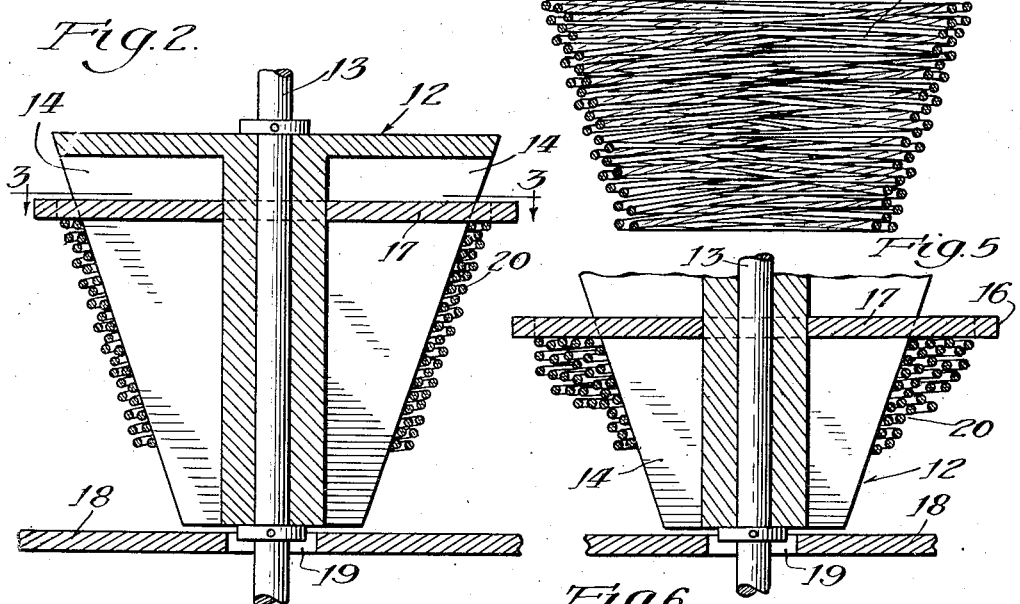
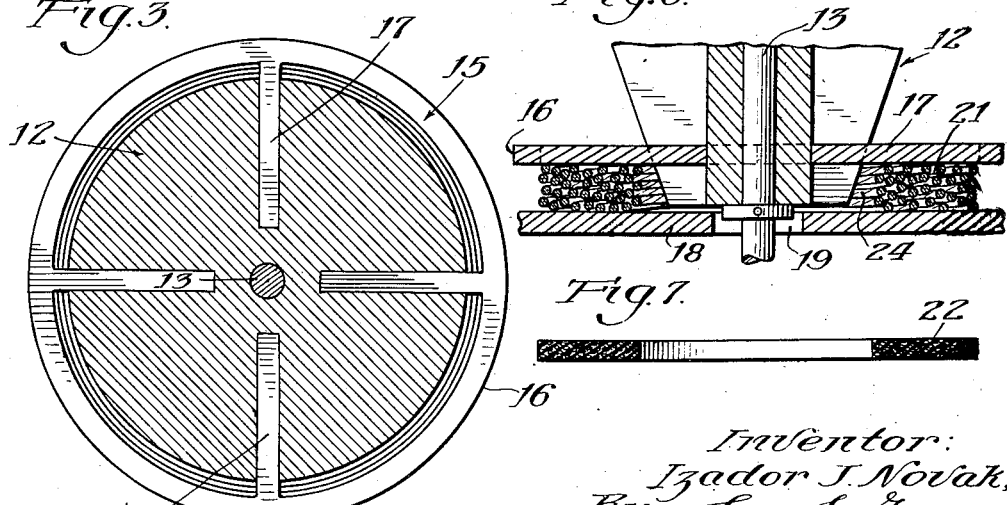
Inventor:
Izador J. Novak,
By: Lee J. Gary
Attorney.

March 24, 1942.  I. J. NOVAK  2,277,602
METHOD OF MAKING AN ENDLESS WOUND CLUTCH FACING
Filed July 24, 1939  2 Sheets-Sheet 2
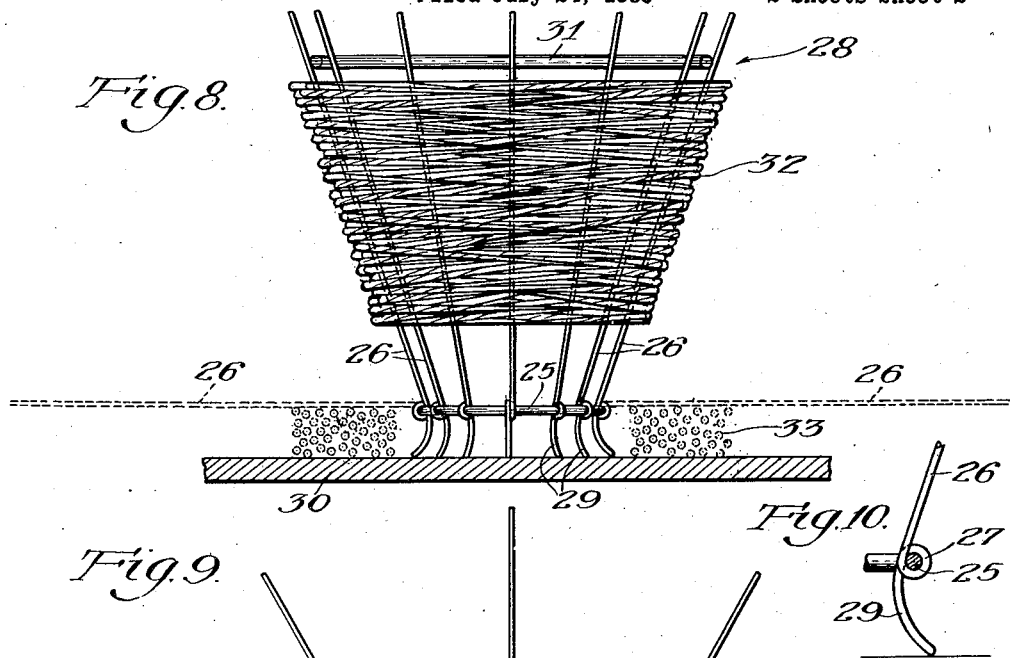
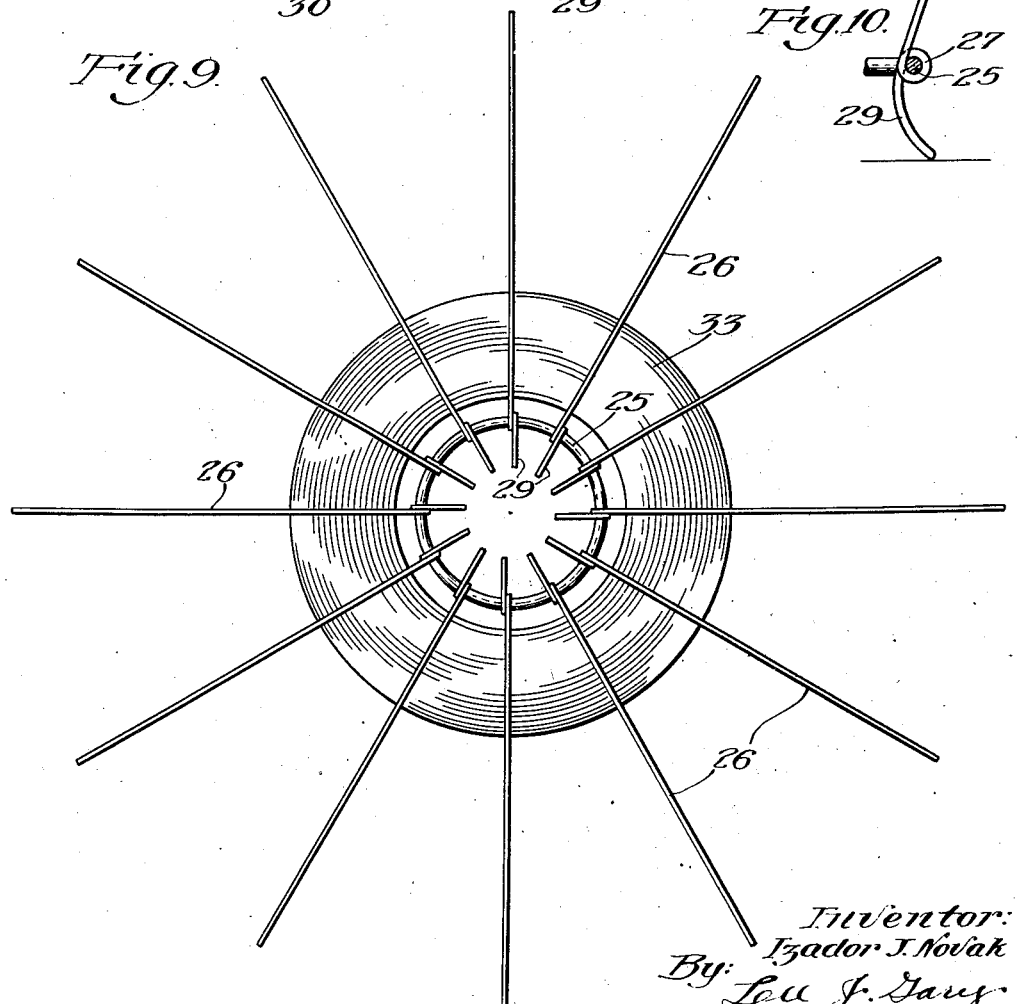
Inventor:
Izador J. Novak
By Lou J. Gaug
Attorney Patented Mar. 24, 1942

2,277,602

UNITED STATES PATENT OFFICE 2,277,602

METHOD OF MAKING AN ENDLESS WOUND CLUTCH FACING

Izador J. Novak, Trumbull, Conn., assignor to Raybestos-Manhattan, Inc., Bridgeport, Conn., a corporation of New Jersey Application July 24, 1939, Serial No. 286,054

5 Claims. (Cl. 154—2)

This invention relates to improvements in friction materials and processes for making the same, and refers specifically to an improved, endless-type clutch facing and a process for making such facing.

It has heretofore been proposed to make clutch facings, particularly for automotive and industrial purposes, by "coning" strips of fabric to form a helix of said fabric strips; cutting said helix at 360 degree intervals and joining the cut ends by means of staples or the like to form a ring. This type of clutch ring or facing is a more economical form of the type of facing which is die-cut from a large area of cloth. However, at high rotary speeds the centrifugal force exerted upon stapled facings tends to rupture the same particularly at the stapled joint.

To eliminate the disadvantage inherent in the stapled facing and the excessive waste involved in the making of die-cut facings, another form of facing has heretofore been proposed, which comprises a ring built up from spirally wound asbestos yarn impregnated with a suitable binder. However, this type of facing is also subject to rupturing, the rupture usually occurring circularly between adjacent layers of yarn in the rivet circles. The reason for this characteristic type of rupture is that, in winding the yarn the same is disposed in distinct planes or laminae, either circularly with the laminae substantially concentric with the clutch ring or with the laminae extending at right angles to the axis of the rings, and in most instances both conditions obtain, and there remains only the adhesiveness of the binder to resist the splitting action of the rivets.

In my present invention a continuously wound facing is contemplated having no junctures or staples. In addition, unlike conventional wound facings the loops of the wound material are heterogeneously disposed in the final product, that is, any predetermined loop of wound yarn is disposed at an oblique angle to both the face of the clutch rings and to its axis, and further, no two consecutive loops are disposed adjacent each other, nor does any increment of a predetermined loop occupy a relatively same radial position in the finished facing as any other increment of said loop. In this type of facing structure reinforcing components along the length of the wound strands are provided for resisting radial forces due to centrifugal motion and the strands are disposed transversely to the rivet circles thus avoiding splitting along rivet circles.

The fundamental concept of my invention resides in winding loops of yarn or strand-like material upon a conical surface in the form of a conical helix, the strand being guided in a path parallel to the axis of the cone in a simple reciprocating manner or in, what may be termed, a retrogressive reciprocating manner, the rate of movement of the yarn parallel to the axis of the cone being correlated with the rate of rotation of the conical surface to control the pitch of the helix. After winding a predetermined weight of the yarn, as described, the wound mass is removed from the conical surface in a direction substantially parallel to the axis of the frusto conical form. The loops adjacent the larger diameter face of the frustum forming the outside diameter of the finished ring and the loops adjacent the smaller diameter faces of the frustum forming the inside diameter of the ring, the mass of yarn being rearranged to confine all of the strands within these radial dimensions of the ring. In effect, therefore, the individual loops of the yarn in the final product are projected from their position upon the conical surface to a plane at right angles to the axis of the cone, and the net result is a clutch facing which has no regular incipient planes of cleavage which would be easily ruptured by radially acting centrifugal forces or forces of shear acting parallel to the plane of the face of the ring.

Other objects and advantages of my invention will be apparent from the accompanying drawings and following detailed description.

In the drawings, Fig. 1 is a diagrammatic side elevational view of suitable apparatus for carrying out my process and making the product.

Fig. 2 is a sectional elevational view of a conical form upon which the yarn is wound.

Fig. 3 is a horizontal, sectional view taken on line 3—3 of Fig. 2.

Fig. 4 is a sectional view taken through a mass of the wound yarn, illustrating particularly the heterogeneous disposition of the yarn loops.

Fig. 5 is a fragmentary view similar to that shown in Fig. 2, showing the initial step in removing the yarn mass from the conical form.

Fig. 6 is a similar view illustrating the final step in removing the yarn.

Fig. 7 is a sectional view of a finished clutch facing embodying the concepts of my invention.

Fig. 8 is a side elevational view of a modified apparatus for carrying out my invention.

Fig. 9 is a top plan view of the device shown in Fig. 8 in opened position.

Fig. 10 is a detailed elevational view of the hinged portion of one of the ribs comprising the apparatus shown in Fig. 8.

Referring in detail to the drawings, 1 indicates a roll of asbestos yarn, asbestos covered wire or other strand-like material suitable for the construction of friction materials. A strand 2 is drawn from roll 1 and is passed over a guide roll 3 and thence under guide roll 4 for immersing the strand 2 in a bath 5 of binder material carried by vat 6. Upon leaving the bath 5 the strand 2 is passed over guide roll 7. The strand may at this point be dried, if desired, to a slightly tacky condition or carried into the next operation while still wet.

The coated or saturated strand 2 is then threaded through the eye 8 of a reciprocating member 9 whereby said strand is guided in a simple reciprocating manner or in a manner, which may be termed, retrogressively reciprocating, that is the member 9 vibrates along the path of its reciprocating movement, moving forwardly a greater distance each stroke than it moves backwardly until the limit of the reciprocating path is reached and then reversing the operation until the opposite limit of the reciprocating path is reached.

The strand 2, thus guided along the longitudinal axis of the member 9, is wound upon the surface of a conical frustrum 10, which, in turn is carried upon shaft 11 which is rotated by any suitable means (not shown). The frustrum 10 may be of substantially any desired altitude or axial length and the angle of the conical surfaces will be dependent upon the final dimensions of the clutch facings desired to be made thereon. It can readily be seen, and as will be hereinafter more fully described, that the thickness of the finished clutch facing will depend upon the thickness of the strand mass wound upon the conical surface and also upon the angle of the conical surfaces. The radial width of the finished clutch facing is substantially dependent upon the area of the conical surface wrapped and the angle of the conical surfaces. As the amount of strand material upon the conical surface increases the thickness of the finished facing increases. As the apex angle of the cone increases the thickness of the facing decreases, and vice versa, other factors remaining constant. Similarly as the dimension of the area of the conical surface covered by the strand mass in the direction of the length of the conical surface increases, the radial width of the finished facing increases, and as the apex angle of the cone increases the radial width increases.

In addition, the circular dimensions of the frustrum adjacent the large and small diameter faces are dependent substantially upon the inner and outer diameters of the finished clutch rings which are to be made, since the diameter of the smaller diameter end of the mass wound upon the conical frustrum determines the inner diameter of the finished clutch ring and likewise the diameter of the larger diameter end of the mass determines approximately the outer diameter of the finished facing, neglecting, of course, finishing operations.

As an example of a frustro-conical form similar to the member 10 which has been found suitable for a wide range of facing dimensions, a frustrum having a small face of about 5½ inches in diameter, a large face of about 10 inches in diameter and an apex angle of about 20 degrees, has been found satisfactory. However, I do not wish to be limited to these dimensions for the obvious reason that dimensions of the frustro-conical form will be dictated by the size and type of clutch facings to be made and the size of the yarn.

In carrying out the winding operation, the winding is done upon the member 10 between diameters of the frustro-conical member corresponding approximately to the inner and outer diameters of the clutch facings to be made. The rate of rotation of the shaft 11 is correlated with the movement of the member 9 to control the pitch of the winding and this relationship is preferably such that consecutive loops are not laid adjacent each other. However, any ratio of these two factors is contemplated. If desired, the degree of heterogeneity may be increased by making the movement of the member 9 variable while maintaining the rate of rotation of the shaft 11 constant, or by varying the rate of rotation of the shaft while maintaining the movement of the member 9 constant, by varying both simultaneously or by maintaining the ratio of the two movements constant.

After a suitable weight of strand material 2 has been wound upon the surface of the frustro-conical form 10, the mass is moved downwardly along the axis of the form, rearranging the relationship of the individual loops with respect to each other. The loops, however, of the mass upon the frustro-conical form substantially retain their radial position with respect to the axis of the form, the relative displacement of the individual loops with respect to each other being principally in a direction parallel to the axis of the form. In tracing the strand through the mass after removal from the form it will be noted that the strand meanders inwardly and outwardly with respect to the axis of the facing, and simultaneously meanders upwardly and downwardly with respect to the faces of the clutch ring, while at the same time traversing an endless path around the ring.

The mass of strand material wound upon the frustro-conical form may be removed from the conical surface, as hereinbefore described, in any convenient manner. The following described manner of removal has been found to be satisfactory but is not to be construed as the only way in which the operation can be performed.

Referring particularly to Figs. 2, 3, 5 and 6, a frustro-conical form 12 is illustrated as being mounted upon a vertical shaft 13, with the larger diameter face uppermost and the smaller diameter face lowermost. The form 12 is provided with circumferentially spaced slots 14, which, as shown, are spaced 90 degrees from each other. Of course, as many slots as desired may be provided so long as the circular form of the conical surface is substantially preserved.

A ring 15 is utilized with the form 12, said ring having a rim portion 16 and inwardly extending radial arms 17 spaced so as to extend into slots 14. A plate 18 is mounted beneath the form 12 adjacent the lower face thereof and is provided with an aperture 19 through which shaft 13 extends, said plate being suitably supported by any convenient means (not shown).

In utilizing form 12, the ring 15 is disposed upon form 12 with arms 17 extending into slots 14, and said ring is positioned at a desired height along the axis of the form. A mass of strand material 20 is then wound upon the form 12 in the manner hereinbefore described. After the winding operation is completed, the ring 15 may be moved downwardly, as shown in Fig. 5, the arms 17 stripping the strand loops from the surface of the form and projecting them downwardly in a direction substantially parallel to the axis of the form. In Fig. 6 the mass is entirely removed from the form face and is disposed upon plate 18 between said plate and the arms 17 of the ring. The mass is then roughly in the form of a clutch ring, as shown at 21 in Fig. 6, and may be cold pressed if desired to make an easily handled blank for molding.

The mass is then inserted in a suitable mold (not shown) and subjected to heat and pressure and the binder is cured. After sanding and other finishing operations the mass then appears as a finished clutch facing 22. As can readily be seen, as indicated, generally at 23 in Fig. 4, and 24 in Fig. 6, the strands comprising the facing 22 are heterogeneously disposed and are conducive to excellent strength both against radial and shearing forces.

The binder 5 may comprise any of the conventional binders now employed in the making of friction material such as rubber, synthetic resins, polymerized drying oils or the like. One type of binder which has been found suitable comprises a cement having the following constituents:

| | Percent |
|---|---|
| Rubber | 10 |
| Barytes | 37 |
| Graphite | 5 |
| Carbon black | 4 |
| Litharge | 34 |
| Plasticizers | 2 |
| Sulphur | 8 |
| Total | 100 |

If desired, the mass may be wound upon the form without previously passing the strand through the binder bath 5, and the binder may be applied after the winding operation.

Referring particularly to Figs. 8, 9 and 10, a modified apparatus for carrying out my invention is illustrated. This embodiment of the apparatus comprises a ring 25 to which is swingably or pivotally secured at substantially equally spaced intervals around the circumference of the ring, a plurality of rods 26. As a convenient mode of attachment of the rods to the ring, each rod is looped upon the ring, as shown best at 27 in Fig. 10, to permit the rod to swing at right angles to the ring. By this arrangement a frustro-conical form, indicated generally at 28 in Fig. 8, is provided, the lower ends 29 of the rods 26 serving as feet to support the form on a suitable flat plate 30. A second ring 31 of larger diameter than ring 25 may be inserted within the circularly disposed rods and depending upon the position of ring 31 with respect to ring 25, determines the apex angle of the cone, or angular inclination of the rods 26.

A mass 32 of strand-like material such as asbestos yarn, preferably previously treated with a suitable binder, may be wound upon the form 28, in the manner described in conjunction with Fig. 1 until a predetermined weight of yarn has been wound. To remove the mass 32 it is merely necessary to move the ring 31 toward ring 25. The action spreads the rods 26 thereby moving the strand material downwardly until the mass is deposited upon the plate 30 in the form of a roughly outlined annular ring 33, at which time the rods 26 will occupy the position shown in Fig. 9 or the dotted-line position shown in Fig. 8.

Thereafter, the ring 33 may be cold pressed to facilitate subsequent handling; molded under heat and pressure to compact the ring and substantially cure the binder.

I claim as my invention:

1. A method of making an endless clutch facing which comprises, winding a mass of strand-like material in the form of a conical helix, displacing the loops of said helix in a direction substantially parallel to the axis of said helix to decrease the pitch of said helix and form an annular ring of said displaced mass, incorporating a curable binder with said strand-like material, and subjecting said mass to pressure and heat to compact the mass and substantially cure the binder.

2. A method of making an endless clutch facing which comprises passing a strand of asbestos yarn through a bath of a curable binder, winding said yarn in the form of a conical helix, displacing the loops of said helix in a direction substantially parallel to the axis of said helix to decrease the pitch of the helix and form an annular ring of the displaced mass of loops, and subjecting the mass to pressure and heat to compact the mass and substantially cure the binder.

3. A method of making an endless clutch facing which comprises passing a strand of asbestos yarn through a bath of a curable binder, winding said yarn in the form of a conical helix the pitch of which is such as to space consecutive loops of the helix, displacing the loops of said helix in a direction substantially parallel to the axis of said helix to decrease the pitch of the helix and form an annular ring of the displaced mass of loops, and subjecting the mass to pressure and heat to compact the mass and substantially cure the binder.

4. A method of making an endless clutch facing which comprises passing a strand of asbestos yarn through a bath of a curable binder, winding said yarn in the form of a plurality of superimposed conical helices, displacing the loops of said superimposed helices in a direction substantially parallel to the axis of said helices to decrease the pitch of said helices and form an annular ring of the displaced loops, and subjecting the mass to pressure and heat to compact the mass and substantially cure the binder.

5. A method of making an endless clutch facing which comprises passing a strand of asbestos yarn through a bath of a curable binder, winding said yarn in the form of a plurality of superimposed conical helices, the pitch of said helices being such as to space consecutive loops of each helix from each other, displacing the loops of said superimposed helices in a direction substantially parallel to the axis of said helices to decrease the pitch of said helices and form an annular ring of the displaced loops, and subjecting the mass to pressure and heat to compact the mass and substantially cure the binder.

IZADOR J. NOVAK.